(12) United States Patent
Tenne et al.

(10) Patent No.: US 7,959,891 B2
(45) Date of Patent: *Jun. 14, 2011

(54) PROCESS AND APPARATUS FOR PRODUCING INORGANIC FULLERENE-LIKE NANOPARTICLES

(75) Inventors: Reshef Tenne, Rehovot (IL); Alexander Margolin, Nes-Ziona (IL); Ronit Popovitz-Biro, Rehovot (IL); Lev Rapoport, Lod (IL)

(73) Assignees: Yeda Research & Development Company Ltd, Rehovot (IL); A.Y.Y.T. Technological Application and Data Update Ltd, Holon (IL)

( * ) Notice: Subject to any disclaimer, the term of this patent is extended or adjusted under 35 U.S.C. 154(b) by 0 days.

This patent is subject to a terminal disclaimer.

(21) Appl. No.: 12/651,912

(22) Filed: Jan. 4, 2010

(65) Prior Publication Data
US 2010/0172823 A1     Jul. 8, 2010

Related U.S. Application Data

(63) Continuation of application No. 11/911,095, filed as application No. PCT/IL2006/000434 on Apr. 6, 2006, now Pat. No. 7,641,886.

(60) Provisional application No. 60/669,000, filed on Apr. 7, 2005.

(51) Int. Cl.
*C01B 17/00*     (2006.01)
*C01B 19/00*     (2006.01)
*C10M 125/22*    (2006.01)

(52) U.S. Cl. ..... 423/508; 423/509; 423/511; 423/561.1; 508/108; 508/110; 508/141; 508/165; 508/166; 508/167; 977/734; 977/773; 977/775; 977/810

(58) Field of Classification Search .............. 423/508, 423/509, 511, 561.1; 508/108, 110, 141, 508/165, 166, 167; 977/734, 773, 775, 810
See application file for complete search history.

(56) References Cited

U.S. PATENT DOCUMENTS
5,958,358 A     9/1999 Tenne et al.
(Continued)

FOREIGN PATENT DOCUMENTS
WO      9744278 A1     11/1997
(Continued)

OTHER PUBLICATIONS

Schuffenhauer, C. et al. "Synthesis of NbS3 nanoparticles with (nested) fullerene-like structure (IF)" J. Mater. Chem. (2002) vol. 12, pp. 1587-1591, especially the abstract, Figure 1 and 2 and the "Experimental" section.

(Continued)

*Primary Examiner* — Timothy C Vanoy
(74) *Attorney, Agent, or Firm* — Browdy and Neimark, PLLC

(57) ABSTRACT

The present invention provides a process for obtaining fullerene-like metal chalcogenide nanoparticles, comprising feeding a metal precursor selected from metal halide, metal carbonyl, organo-metallic compound and metal oxyhalide vapor into a reaction chamber towards a reaction zone to interact with a flow of at least one chalcogen material in gas phase, the temperature conditions in said reaction zone being such to enable the formation of the fullerene-like metal chalcogenide nanoparticles product. The present invention further provides novel IF metal chalcogenides nanoparticles with spherical shape and optionally having a very small or no hollow core exhibiting excellent tribological behaviour. The present invention further provides an apparatus for preparing various IF nanostructures.

19 Claims, 7 Drawing Sheets

U.S. PATENT DOCUMENTS

| | | | |
|---|---|---|---|
| 6,217,843 | B1 | 4/2001 | Homyonfer et al. |
| 6,710,020 | B2 | 3/2004 | Tenne |
| 7,393,516 | B2 * | 7/2008 | Seo et al. .................. 423/508 |
| 7,641,886 | B2 * | 1/2010 | Tenne et al. ................. 423/508 |
| 2009/0033164 | A1 * | 2/2009 | Khan ............................ 310/90 |

FOREIGN PATENT DOCUMENTS

| | | |
|---|---|---|
| WO | 9944278 | 9/1999 |
| WO | 0166462 A2 | 9/2001 |
| WO | 0234959 A2 | 5/2002 |

OTHER PUBLICATIONS

Feldman, A. Zak et al. "New Reactor for Production of tungsten disulfide hollow onion-like (inorganic fullerene-like) nanoparticles" Solid State Sciences 2 (2000) pp. 663-672.

Feldman, Y. et al. "Kinetics of Nested Inorganic Fullerene-like Nanoparticle Formation" 1 Am Chem. Soc. 1998, 120 pages 4176-4183.

Li, Xiao-Lin et al. "Atmospheric Pressure Chemical Vapor Deposition: An Alternative Route to Large-Scale MoS2 and WS2 Inorganic Fullerene-like Nanostructures and Nanoflowers" Chem Eur. J. 2004 10 Pages 6163-6171.

Rapoport L. et al. "Hollow nanoparticles of WS2 as potential solid-state lubricants" Nature vol. 387: Jun. 1997.

Tsirlina T. et al. "Study on preparation, growth mechanism, and opt6oelectronic properties of highly oriented WSe2 thin films" J. Mater. Res. vol. 15, No. 12, Dec. 2000, pp. 2636-2646.

Zak, A. et al. "Growth Mechansm of MoS2 Fullerene-like Nanoparticles by Gas-Phase Synthesis" J. Am Chem. Soc 2000, vol. 122, pp. 11108-11116.

Jun. Chen., "Low Temperature Sysnthesis of Titanium Disulfide Nanotubes", Institute oj New Energy Material Chemistry, Nankai University, Tlanjin 300071, P, R, China, pp. 980-981, (2003).

* cited by examiner

PROCESS AND APPARATUS FOR PRODUCING INORGANIC FULLERENE-LIKE NANOPARTICLES

CROSS-REFERENCE TO RELATED APPLICATIONS

The present application is a continuation of application Ser. No. 11/911,095, now U.S. Pat. No. 7,641,886, filed Oct. 9, 2007, which is a 371 National Stage of PCT/IL2006/000434, filed Apr. 6, 2006 and claims benefit of U.S. provisional Appl. No. 60/669,000, filed Apr. 7, 2005. The entire content of these applications are incorporated herein by reference.

FIELD OF THE INVENTION

This invention relates to a chemical process and apparatus for producing inorganic fullerene-like nanoparticles.

LIST OF REFERENCES

The following references are considered to be pertinent for the purpose of understanding the background of the present invention:
1. L. Rapoport, Yu. Bilik, Y. Feldman, M. Homyonfer, S. Cohen and R. Tenne, Nature, 1997, 387, 791;
2. C. Schffenhauer, R. Popovitz-Biro, and R. Temie, J. Mater. Chem. 2002, 12, 1587-1591;
3. Jun. Chen, Suo-Long Li, Zhan-Liang Tao and Feng Gao, Chem. Commun. 2003, 980-981;
4. WO 97/44278;
5. Y. Feldman, V. Lyakhovitskaya and R. Tenne, J. Am. Chem. Soc. 1998, 120, 4176;
6. A. Zak, Y. Feldman, V. Alperovich, R. Rosentsveig and R. Tenne, J. Am. Chem. Soc. 2000, 122, 11108;
7. Y. Feldman, A. Zak, R. Popovitz-Biro, R. Tenne, Solid State Sci. 2000, 2, 663;
8. WO 01/66462;
9. WO 02/34959;
10. Xiao-Lin Li, Jian-Ping Ge and Ya-Dong Li, Chem. Eur. J. 2004, 10, 6163-6171; and
11. T. Tsirlina and V. Lyakhovitskaya, S. Fiechter, and R. Tenne, J. Mater. Res. 2000, 15, 2636-2646.

BACKGROUND OF THE INVENTION

Carbon nanoparticles having a layered configuration are known as fullerene nanoparticles. Generally, there are three main types of fullerene-related carbon particles: fullerenes ($C_{60}$, $C_{70}$, etc.); nested-fullerene nanoparticles (in the form of onions), and nanotubes. Analogous fullerene-like nanoparticles can be obtained from a number of inorganic materials with layered structure, and are known as inorganic fullerene-like materials.

Inorganic fullerene-like (abbreviated hereinafter "IF") nanoparticles and nanotubes are attractive due to their unique crystallographic morphology and their interesting physical properties.

Layered transition-metal dichalcogenides $MS_2$ (such as $WS_2$ and $MoS_2$) are of great interest as they act as host lattices by reacting with a variety of guest atoms or molecules to yield intercalation compounds, in which the guest is inserted between the host layers. Accordingly, IF transition metal dichalcogenides may be used for instance, for hydrogen storage.

Furthermore, disulfides of molybdenum and tungsten belong to a class of solid lubricants useful in vacuum, space and other applications where liquids are impractical to use. IF nanoparticles can be used as additives to various kinds of oils and greases to enhance their tribological behavior[1]. Furthermore, different coatings with impregnated IF nanoparticles were shown to exhibit self-lubricating behavior.

IF nanoparticles may also be used for other possible applications such as battery cathodes, catalysis, nanoelectronic and magnetic information storage.

The first closed-cage fullerene-like nanoparticles and nanotubes of $WS_2$ were obtained via sulfidization of thin films of the respective trioxides in 1992, followed by $MoS_2$ and the respective diselenides.

Numerous IF nanostructures have been synthesized using different metodologies. The first report related to IF-$MS_2$ (IF-$NbS_2$) structures obtained by the reaction of the metal chloride ($NbCl_5$) and $H_2S$[2]. Later on, Jun Chen et al.[3] used a low-temperature gas reaction to synthesize $TiS_2$ nanotubes. The reaction involved heating $TiCl_4$, $H_2$, and $H_2S$ inside a horizontal furnace at a relatively low temperature of 450° C., and in the absence of oxygen and water.

Another method and apparatus for preparing inorganic fullerene-like nanoparticles of a metal, e.g. transition metal chalcogenide having a desired size and shape in high yields and macroscopic quantities, is described in WO 97/44278[4]. This method utilizes (a) dispersing solid particles of at least one non-volatile metal oxide material having the preselected size and shape; and (b) heating the solid particles of the non-volatile metal material in a reducing gaseous atmosphere containing at least one chalcogen material for a time and a temperature sufficient to allow the metal material precursor and the chalcogen material to react and form at least one layer of metal chalcogenide, the at least one layer of metal chalcogenide encaging the surface of the solid particles to form the fullerene-like particles.

The synthesis of IF-$WS_2$ involves a solid-gas reaction, where the nanocrystalline tungsten oxide, serving as a precursor, reacts with $H_2S$ gas at elevated temperatures[5]. In a different procedure, IF-$MoS_2$ nanoparticles are prepared in the gas phase, upon in-situ reduction and condensation of the $MoO_3$ vapor and subsequent sulfidization by $H_2S$[6].

The availability of fullerene-like $MoS_2$ and $WS_2$ nanoparticles in large amounts paved the way for a systematic investigation of their properties. Both IF-$WS_2$ and IF-$MoS_2$ nanoparticles were found to provide beneficial tribological behavior under harsh conditions[1], suggesting extensive number of tribological applications for these nanoparticles, eliciting substantial industrial interest.

Mass production of IF-$WS_2$ was enabled by the construction of first a falling bed and subsequently fluidized bed reactors[7].

Reactors for mass production of IF-$WS_2$ and IF-$MoS_2$ are described in WO 01/66462 and WO 2/34959, respectively[8,9].

The reported IF-$WS_2$ and IF-$MoS_2$[5-7] were synthesized from their corresponding oxide crystallite that served as a template for the growth of the sulfide nanoparticles. The growth of the sulfide layers in each particle starts on the top surface of the partially reduced oxide nanoparticle terminating in its core. This diffusion-controlled reaction is rather slow, lasting a few hours. The final nanoparticles consist of dozens of sulfide layers and a hollow core occupying 5-10% of the total volume of the nanoparticles.

In another research, large-scale $MoS_2$ and $WS_2$ IF nanostructures (onion-like nanoparticles and nanotubes) and three-dimensional nanoflowers were selectively prepared through an atmospheric pressure chemical vapor deposition process from metal chlorides (e.g. $MoCl_5$ and $WCl_6$) and sulfur[10]. In this technique, selectivity was achieved by varying the reaction temperature, with 750° C. favoring the nanotubes and 850° C. the fullerene-like nanoparticles.

In a further research, tungsten diselenide closed-cage nanoparticles were synthesized by the reaction of prevaporized Se with $WO_3$ powder in a reducing atmosphere[11]. The selenium vapor was brought to the main reaction chamber by a carrier gas. The growth mechanism of the IF-$WSe_2$ nanoparticles was outside-in. This growth mode is analogous to the previously reported growth of IF-$WS_2$ using the reaction between $WO_3$ nanoparticles and $H_2S$ gas[5].

SUMMARY OF THE INVENTION

There is a need in the art to facilitate production of inorganic fullerene-like particles by providing a novel process and apparatus with improved capability to control the shape and size of the structure being produced. Also, there is a need in the art to produce nanoparticles having spherical shape, thus having improved properties, such as tribological, optical, etc.

It was found by the inventors that the known mechanisms for the synthesis of IF-$WS_2$ from metal trioxide powder and the synthesis of IF-$MoS_2$ from the evaporated metal trioxide, are not suitable for other metals such as titanium. For instance, the titanium dioxide can not be easily sulfidized even at the relatively high temperature of up to 1450° C. Also, although the sulfidization of tungsten or molybdenum dioxide results in respective disulfide, the desired morphology of the particle is not obtained.

Furthermore, the inventors have found a more rapid way for making the synthesis of IF nanoparticles that yields a desired spherical shape and a relatively narrow size distribution of produced nanoparticles. The IF nanopartieles synthesized by the technique of the present invention have smaller hollow core (substantially not exceeding 5-10 nm) and they contain many more layers (typically, 50-120 layers) as compared to those synthesized from the metal oxides, which have a relatively large hollow core (more than 20 nm) and fewer number of layers (20-40). Therefore, the presently synthesized IF nanoparticles are expected to reveal improved tribological behavior, which is confirmed by preliminary measurements.

Thus, the present invention provides a process for producing inorganic fullerene-like (IF) nanoparticles having well defined size and shape, from commercially available reactants and in a rather fast reaction. The large number of molecular layers, i.e. 50-120 in the present synthesis is advantageous for tribological applications where the lifetime of the nanoparticle is determined by the gradual deformation and peeling-off of the outer layers of the nanoparticle.

The process of the present invention occurs in the gas phase, and is suitable for mass production of inorganic fullerene-like nanoparticles of metal chalcogenides. The process is based on a reaction between a metal precursor, e.g. metal halide, metal oxyhalide, metal carbonyl or organometallic compound (hereinafter termed "metal containing precursor" or "metal precursor") and a reacting agent, e.g. chalcogen material, both in the gas phase. The use of metal carbonyls, for example, has the advantage that its decomposition in the reactor leads to the release of CO which is a strongly reducing agent and allows to overcome the sensitivity of this reaction to oxidizing atmosphere.

Thus according to a first aspect thereof, the present invention provides a process for producing inorganic fullerene-like (IF) metal chalcogenide nanoparticles, the process comprising:

(a) feeding a metal precursor selected from metal halide, metal carbonyl, organo-metallic compound and metal oxyhalide vapor into a reaction chamber towards a reaction zone to interact with a flow of at least one chalcogen material in gas phase, the temperature conditions in said reaction zone being such as to enable the formation of the inorganic fullerene-like (IF) metal chalcogenide nanoparticles.

According to a preferred embodiment, the process comprises:

(b) controllably varying the flow of said metal precursor into said reaction chamber to control the amount, shape and size of the so-produced IF fullerene-like metal chalcogenide nanoparticles in solid form.

Preferably, the vapor of the metal precursor is fed into the reaction chamber to flow towards the reaction zone along a vertical path, e.g. along an upward/downward direction that is opposite with respect to that of the chalcogen material that is being fed in a downward/upward direction.

The nanoparticles produced by the process of the invention are characterized by narrow size distribution and large number of molecular layers.

The invention also provides IF metal chaleogenide nanoparticies having a plurality of molecular layers and characterized in that the number of said molecular layers exceeds 40, preferably exceeds 50 and at times exceeds 60 and even 70 layers. According to one embodiment of the invention there is provided a product comprising a plurality of IF metal chalcogenide nanoparticles, a substantial portion of which having a number of molecular layers exceeding 40, preferably exceeds 50 and at times exceeds 60 and even 70 layers. The substantial portion is typically more than 40% out of the nanoparticles, preferably more than 50%, 60%, 70%, 80% and at times even more than 90% out of the total number of the IF nanoparticles.

Furthermore, the IF fullerene-like metal chalcogenide nanoparticles produced by the process of the present invention optionally have no hollow core or a very small hollow core (not exceeding 5-10 nm).

The term "very small hollow core" as used herein means that the nanoparticles produced by the process of the present invention have a hollow core which is not exceeding 5 nm or occupying no more than 0-5% of the total volume of the nanoparticles.

The term "nanoparticles" as used herein refers to multilayered, spherical, or close to spherical particle having a diameter in the range from about 10 nm to about 300 nm, preferably from about 30 nm to about 200 nm. The nanoparticles of the invention may typically have 50-120 concentric molecular layers.

The nanoparticles obtained by the process of the present invention have a spherical, or close to spherical shape and optionally have no hollow core. The provision of a very small hollow core or even absence of such core may be explained by the mechanism of growth of the nanoparticles, namely from the central portion (nucleai of product) towards the peripheral portion, rather than the opposite direction carried out in the known processes.

Preferably, the term "metal" as used herein refers to In, Ga, Sri or a transition metal.

A transition metal includes all the metals in the periodic table from titanium to copper, from zirconium to silver and from hafnium to gold. Preferably, the transition metals are selected from Mo, W, V, Zr, Hf, Pt, Pd, Re, Nb, Ta, Ti, Cr and Ru.

A chalcogen used in the invention is S, Sc or Te, and the chalcogen material is selected from a chalcogen, a compound containing a chalcogen, a mixture of chaleogens, a mixture of compounds containing a chalcogen, and a mixture of a chalcogen and a compound containing a chalcogen.

The chalcogen material is preferably a chalcogen compound containing hydrogen, more preferably $H_2S$, $H_2Se$ and/or $H_2Te$. Alternatively, instead of $H_2X$ (X=S, Se, Te) it is possible to use elemental chalcogen under the flow of hydrogen with $H_2X$ being formed in-situ during the reaction time. The chalcogen material may optionally be mixed with a reducing agent such as hydrogen and/or CO.

In a preferred embodiment of the invention, an inert carrier gas is used to drive a flow of the chalcogen material and a flow of the vaporized metal precursor into the reaction chamber. Non limiting examples of inert gases that may be used in the process of the present invention are $N_2$, He, Ne, Ar, Kr and Xe.

The term "precursor" as used herein means any suitable starting material or materials. The precursor in the process of the present invention may be any metal containing compound that can be vaporized without or with its decomposition. Suitable metal containing precursors that may be used in the process of the present invention are, for example, metal halides, metal carbonyls, organo-metallic compounds and metal oxyhalides. More specific examples of metal containing precursors that may be used in the process of the present invention are $TiCl_4$, $WCl_6$, $WCl_5$, $WCl_4$, $WBr_5$, $WO_2Cl_2$, $WOCl_4$, $MoCl_5$, $Mo(CO)_5$ and $W(CO)_6$, $Ga(H_3)_3$, $W(CH_2CH_3)_5$, $In(CH_3)_3$ and the like.

A list of metal precursor compounds that can be used in the process of the present invention is given in Table 1 below.

TABLE 1

Examples of metal precursors

| Name | Formula | mp, ° C. | bp,° C. |
|---|---|---|---|
| Chromium carbonyl | $Cr(CO)_6$ | 130 (dec) | subl |
| Chromium (III) iodide | $CrI_3$ | 500 (dec) | |
| Chromium (IV) chloride | | 600 (dec) | |
| Chromium (IV) fluoride | $CrF_4$ | 277 | |
| Chromium (V) fluoride | $CrF_5$ | 34 | 117 |
| Chromium (VI) fluoride | $CrF_6$ | 100 (dec) | |
| Cromyl chloride | $CrO_2Cl_2$ | −96.5 | 117 |
| Trimethylgallium | $Ga(CH_3)_3$ | −15.8 | 55.7 |
| Hafnium bromide | $HfBr_4$ | 424 (tp) | 323 (sp) |
| Hafnium chloride | $HfCl_4$ | 432 (tp) | 317 (sp) |
| Hafnium iodide | $HfI_4$ | 449 (tp) | 394 (sp) |
| Trimethylindium | $In(CH_3)_3$ | 88 | 133.8 |
| Molybdenum carbonyl | $Mo(CO)_6$ | 150 (dec) | subl |
| Molybdenum (V) chloride | $MoCl_5$ | 194 | 268 |
| Molybdenum (V) fluoride | $MoF_5$ | 67 | 213 |
| Molybdenum (V) oxytrichloride | $MoOCl_3$ | 297 | subl |
| Molybdenum (VI) fluoride | $MoF_6$ | 17.5 | 34 |
| Molybdenum (VI) oxytetrafluoride | $MoOF_4$ | 98 | |
| Molybdenum (VI) oxytetrachloride | $MoOCl_4$ | 101 | |
| Molybdenum (VI) dioxydichloride | $MoO_2Cl_2$ | 175 | |
| Niobium (IV) chloride | $NbCl_4$ | | |
| Niobium (IV) fluoride | $NbF_4$ | 350 (dec) | |
| Niobium (IV) iodide | $NbI_4$ | 503 | |
| Niobium (V) bromide | $NbBr_5$ | 254 | 360 |
| Niobium (V) chloride | $NbCl_5$ | 204.7 | 254 |
| Niobium (V) fluoride | $NbF_5$ | 80 | 229 |
| Niobium (V) iodide | $NbI_5$ | 200 (dec) | |
| Niobium (V) oxybromide | $NbOBr_3$ | 320 (dec) | subl |
| Niobium (V) oxychloride | $NbOCl_3$ | | subl |
| Niobium (V) dioxyfluoride | $NbO_2F$ | | |
| Palladium (II) bromide | $PdBr_2$ | 250 (dec) | |
| Palladium (II) iodide | $PdI_2$ | 360 (dec) | |
| Platinum (II) bromide | $PtBr_2$ | 250 (dec) | |
| Platinum (II) chloride | $PtCl_2$ | 581 (dec) | |
| Platinum (II) iodide | $PtI_2$ | 325 (dec) | |
| Platinum (III) bromide | $PtBr_3$ | 200 (dec) | |
| Platinum (III) chloride | $PtCl_3$ | 435 (dec) | |
| Platinum (IV) bromide | $PtBr_4$ | 180 (dec) | |
| Platinum (IV) chloride | $PtCl_4$ | 327 (dec) | |
| Platinum (IV) fluoride | $PtF_4$ | 600 | |

TABLE 1-continued

Examples of metal precursors

| Name | Formula | mp, ° C. | bp,° C. |
|---|---|---|---|
| Platinum (IV) iodide | $PtI_4$ | 130 (dec) | |
| Platinum (VI) fluoride | $PtF_6$ | 61.3 | 69.1 |
| Rhenium carbonyl | $Re_2(CO)_{10}$ | 170 (dec) | |
| Rhenium (III) bromide | $ReBr_3$ | | 500 (subl) |
| Rhenium (III) chloride | $ReCl_3$ | 500 (dec) | |
| Rhenium (III) iodide | $ReI_3$ | (dec) | |
| Rhenium (IV) chloride | $ReCl_4$ | 300 (dec) | |
| Rhenium (IV) fluoride | $ReF_4$ | | 300 (subl) |
| Rhenium (V) bromide | $ReBr_5$ | 110 (dec) | |
| Rhenium (V) chloride | $ReCl_5$ | 220 | |
| Rhenium (V) fluoride | $ReF_5$ | 48 | 220 |
| Rhenium (VI) chloride | $ReCl_6$ | 29 | |
| Rhenium (VI) fluoride | $ReF_6$ | 18.5 | 33.7 |
| Rhenium (VI) oxytetrachloride | $ReOCl_4$ | 29.3 | 223 |
| Rhenium (VI) oxytetrafluoride | $ReOF_4$ | 108 | 171 |
| Rhenium (VII) fluoride | $ReF_7$ | 48.3 | 73.7 |
| Rhenium (VII) trioxycloride | $ReO_3Cl$ | 4.5 | 128 |
| Rhenium (VII) trioxyfluoride | $ReO_3F$ | 147 | 164 |
| Rhenium (VII) dioxytrifluoride | $ReO_2F_3$ | 90 | 185 |
| Rhenium (VII) oxypentafluoride | $ReOF_5$ | 43.8 | 73 |
| Ruthenium dodecacarbonyl | $Ru_3(CO)_{12}$ | 150 (dec) | |
| Ruthenium (III) bromide | $RuBr_3$ | 400 (dec) | |
| Ruthenium (III) chloride | $RuCl_3$ | 500 (dec) | |
| Ruthenium (III) fluoride | $RuF_3$ | 600 (dec) | |
| Ruthenium (III) iodide | $RuI_3$ | | |
| Ruthenium (IV) fluoride | $RuF_4$ | 86.5 | 227 |
| Ruthenium (V) fluoride | $RuF_5$ | 54 | |
| Tantalum (V) bromide | $TaBr_5$ | 265 | 349 |
| Tantalum (V) chloride | $TaCl_5$ | 216 | 239.35 |
| Tantalum (V) fluoride | $TaF_5$ | 95.1 | 229.2 |
| Tantalum (V) iodide | $TaI_5$ | 496 | 543 |
| Titanium (III) bromide | $TiBr_3$ | | |
| Titanium (III) chloride | $TiCl_3$ | 425 (dec) | |
| Titanium (IV) bromide | $TiBr4$ | 39 | 230 |
| Titanium (IV) chloride | $TiCl_4$ | −25 | 136.45 |
| Titanium (IV) fluoride | $TiF_4$ | 284 | subl |
| Titanium (IV) iodide | $TiI_4$ | 150 | 377 |
| Tungsten carbonyl | $W(CO)_6$ | 170 (dec) | subl |
| Tungsten (II) bromide | $WBr_2$ | 400 (dec) | |
| Tungsten (II) chloride | $WCl_2$ | 500 (dec) | |
| Tungsten (II) iodide | $WI_2$ | | |
| Tungsten (III) bromide | $WBr_3$ | 80 (dec) | |
| Tungsten (III) chloride | $WCl_3$ | 550 (dec) | |
| Tungsten (V) bromide | $WBr_5$ | 286 | 333 |
| Tungsten (V) chloride | $WCl_5$ | 242 | 286 |
| Tungsten (V) fluoride | $WF_5$ | 80 (dec) | |
| Tungsten (V) oxytribromide | $WOBr_3$ | | |
| Tungsten (V) oxytrichloride | $WOCl_3$ | | |
| Tungsten (VI) bromide | $WBr_6$ | 309 | |
| Tungsten (VI) chloride | $WCl_6$ | 275 | 246.75 |
| Tungsten (VI) dioxydibromide | $WO_2Br_2$ | | |
| Tungsten (VI) dioxydichloride | $WO_2Cl_2$ | 265 | |
| Tungsten (VI) dioxyiodide | $WO_2I_2$ | | |
| Tungsten (VI) fluoride | $WF_6$ | 2.3 | 17 |
| Tungsten (VI) oxytetrabromide | $WOBr_4$ | 277 | 327 |
| Tungsten (VI) oxytetrachloride | $WOCl_4$ | 211 | 227.55 |
| Tungsten (VI) oxytetrafluoride | $WOF_4$ | 106 | 186 |
| Vanadium carbonyl | $V(CO)_6$ | 60 (dec) | subl |
| Vanadium (IV) chloride | $VCl_4$ | −25.7 | 148 |
| Vanadium (IV) fluoride | $VF_4$ | 325 (dec) | subl |
| Vanadium (V) fluoride | $VF_5$ | 19.5 | 48.3 |
| Vanadyl bromide | $VOBr$ | 480 (dec) | |
| Vanadyl chloride | $VOCl$ | 700 (dec) | |
| Vanadyl dibromide | $VOBr_2$ | 180 (dec) | |
| Vanadyl dichloride | $VOCl_2$ | 380 (dec) | |
| Vanadyl difluoride | $VOF_2$ | | |
| Vanadyl tribromide | $VOBr_3$ | 180 (dec) | |
| Vanadyl trichloride | $VOCl_3$ | −79 | 127 |
| Vanadyl trifluoride | $VOF_3$ | 300 | 480 |
| Zirconium chloride | $ZrCl_4$ | 437 (tp) | 331 (sp) |
| Zirconium fluoride | $ZrF_4$ | 932 (tp) | 912 (sp) |
| Zirconium iodide | $ZrI_4$ | 499 (tp) | 431 (sp) |

Abbreviations:
(dec)—decomposes
(sp)—sublimation point

TABLE 1-continued

Examples of metal precursors

| Name | Formula | mp, ° C. | bp,° C. |
|---|---|---|---|

(subl)—sublimes
(tp)—triple point

According to a preferred embodiment of the invention, the process further comprises at least one, preferably both of the following steps:

(c) terminating the feeding of the metal precursor vapor into the reaction chamber by stopping heating of the metal precursor;

(d) cooling the reaction zone and collecting the obtained fullerene-like metal chalcogenide nanoparticles.

In another preferred embodiment, the process may comprise driving a flow of an inert gas into the reaction zone after step (c) and before step (d).

In a further preferred embodiment, the process may further comprise annealing to allow the precursor to react completely.

As indicated above, the temperature profile (conditions) used in the reaction zone is preferably such so as to enable the formation of the nanoparticles such that the nuclei of the nanoparticles have essentially no or very small hollow core. This results, among others, from the fact that formation of the nanoparticles is thorough a mechanism involving growth of the nanoparticles from the central portion (nuclei of product) towards the peripheral portion.

Preferably, the temperature within the reaction zone is in the range of 500° C. to 900° C., depending on the particular material being synthesized by the process (see examples below). The gradient of the temperature within the reactor provides lowering of the temperature towards the filter.

In the process of the present invention, the amount, morphology and size of the nanoparticles are controlled by the flow of the metal precursor vapor. This flow may be controlled by adjusting the rate of the flow of an inert gas driving the vapor into the reaction chamber; and/or adjusting the temperature used for heating the metal precursor to obtain a vapor thereof.

The heating temperature of the metal precursor is preferably very close to its boiling point. More specifically, it is in the range of between 50 degree below the boiling point and up to the boiling point of said metal precursor.

The process described above allows the preparation of nanoscale inorganic fullerene-like (IF) metal chalcogenides having spherical shape optionally with a very small or no hollow core. The metal chalcogenides are preferably selected from $TiS_2$, $TiSe_2$, $TiTe_2$, $WS_2$, $WSe_2$, $WTe_2$, $MoS_2$, $MoSe_2$, $MoTe_2$, $SnS_2$, $SnSe_2$, $SnTe_2$, $RuS_2$, $RuSe_2$, $RuTe_2$, $GaS$, $GaSe$, $GaTe$, $In_2S_3$, $In_2Se_3$, $In_2Te_3InS$, $InSe$, $Hf_2S$, $HfS_2$, $ZrS_2$, $VS_2$, $ReS_2$ and $NbS_2$.

According to one preferred embodiment of the invention, novel $TiS_2$ nanoparticles with fullerene-like structure having quite a perfectly spherical shape and consisting of up to 120 concentric molecular layers, were obtained by the reaction of $TiCl_4$ and $H_2S$, using a vertical reactor. The obtained IF-$TiS_2$ exhibited excellent tribological behavior resulting probably from their close to a spherical shape which promotes rolling friction.

An apparatus of the present invention includes a reaction chamber, and a separate evaporation chamber, which is operated and whose connection to the reaction chamber is controllably operated to control the shape, size and amount of the product being produced. The control of the output parameters of the process (the shape, size and amount of the nanoparticles) is significantly improved by utilizing a vertical configuration of the reaction chamber. Thus, the present invention provides according to a further aspect thereof, an apparatus for preparing IF nanostructures, the apparatus comprising: a reaction chamber having inlets for inputting reacting gases and an outlet; a separate evaporation chamber for separately preparing a precursor vapor; and a control unit configured and operable for controlling the precursor vapor flow into the reaction chamber.

Preferably, the reaction chamber is a vertical chamber with the gas inlet accommodated so as to provide the reacting gases flow in opposite directions towards a reaction zone where they meet and react with each other. Preferably, the control unit comprises a bypass arrangement associated with the evaporation chamber. This bypass is configured and operable to provide a flow of clean inert gas instead of one enriched with vaporized precursor at certain moments of the reaction as described for instance, in Example 1 below. This improvement is of importance for the synthetic procedure preventing the flow of the highly reactive precursor during the heating up and cooling down steps of the synthesis.

According to yet another broad aspect of the invention, there is provided an apparatus for preparing IF nanostructures, the apparatus comprising: (i) a reaction chamber configured to be vertically oriented during the apparatus operation, and having gas inlets located at top and bottom sides of the chamber so as to direct a precursor vapor and the other reacting gas in opposite directions towards a reaction zone where the gases meet and react with each other; (ii) a separate evaporation chamber configured and operable for separately preparing the precursor vapor and feeding it to the respective inlet of the reaction chamber; and (c) a control unit configured and operable for controlling the precursor vapor flow into the reaction chamber.

BRIEF DESCRIPTION OF THE DRAWINGS

In order to understand the invention and to see how it may be carried out in practice, preferred embodiments will now be described, by way of non-limiting examples only, with reference to the accompanying drawings, in which.

Insert shows the Fast Fourier Transform (FFT) of the shown nanoparticle.

Figures 5A, 5B:
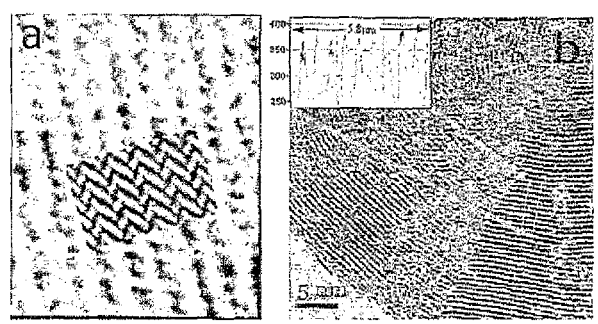

FIG. 5A is the HRTEM image of a part of an IF-$TiS_2$ nanoparticle produced in a vertical reactor with an overlay of the simulated $TiS_2$ pattern (view down [110], simulation with thickness 20 nm and defocus of −20 nm).

FIG. 5B shows the measurement of the interlayer distance by HRTEM.

Figure 6:
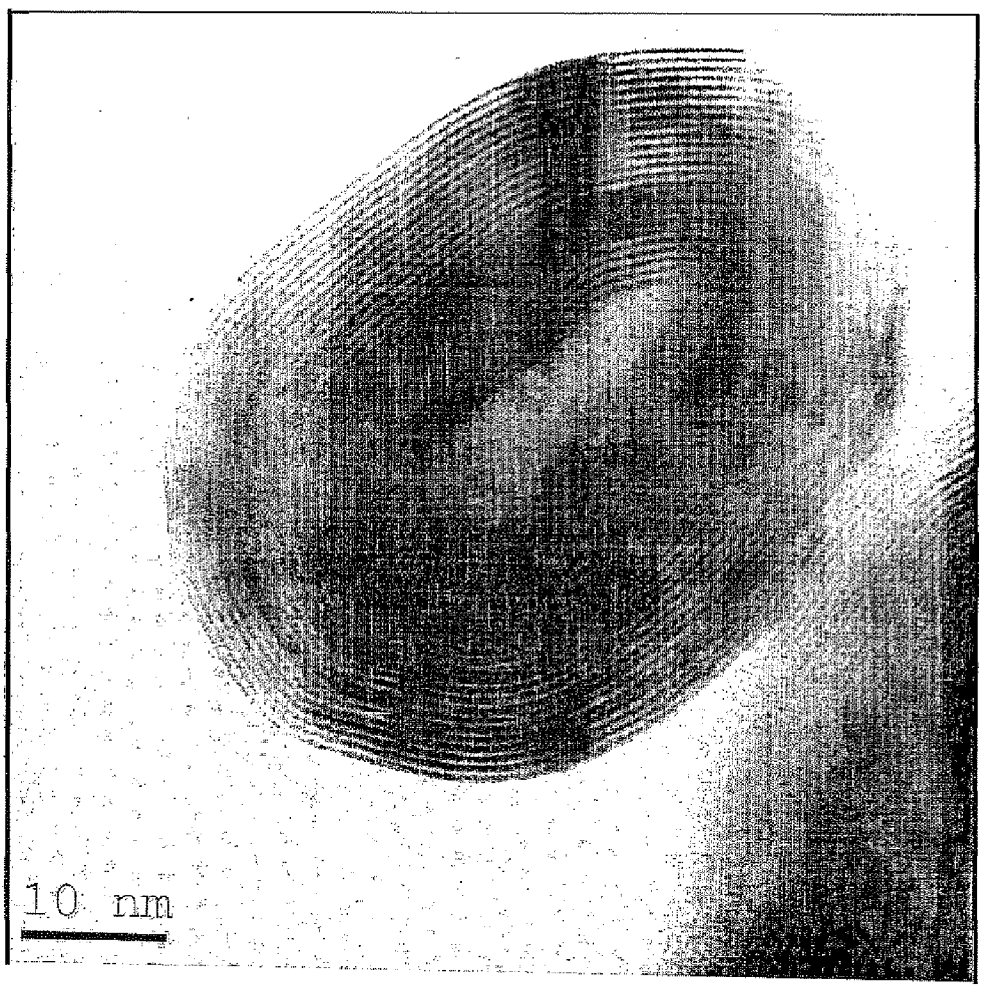

FIG. 6 shows the typical IF-$WS_2$ obtained from $WO_2Cl_2$ and $H_2S$ in a horizontal reactor.

Figure 7:
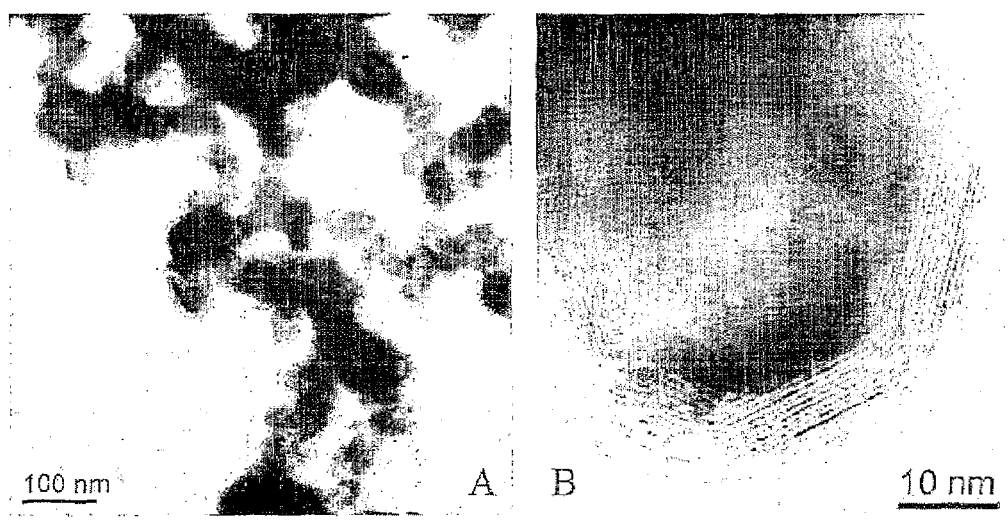

FIG. 7A is the magnified TEM image of a group of IF-$WS_2$ nanoparticles received in a reaction of $WCL_4$ and $H_2S$ in a vertical reactor.

FIG. 7B is the TEM image of individual closed-caged LF-$WS_2$ nanoparticle received in a reaction of $WCL_4$ and $H_2S$ in a vertical reactor.

Figure 8:
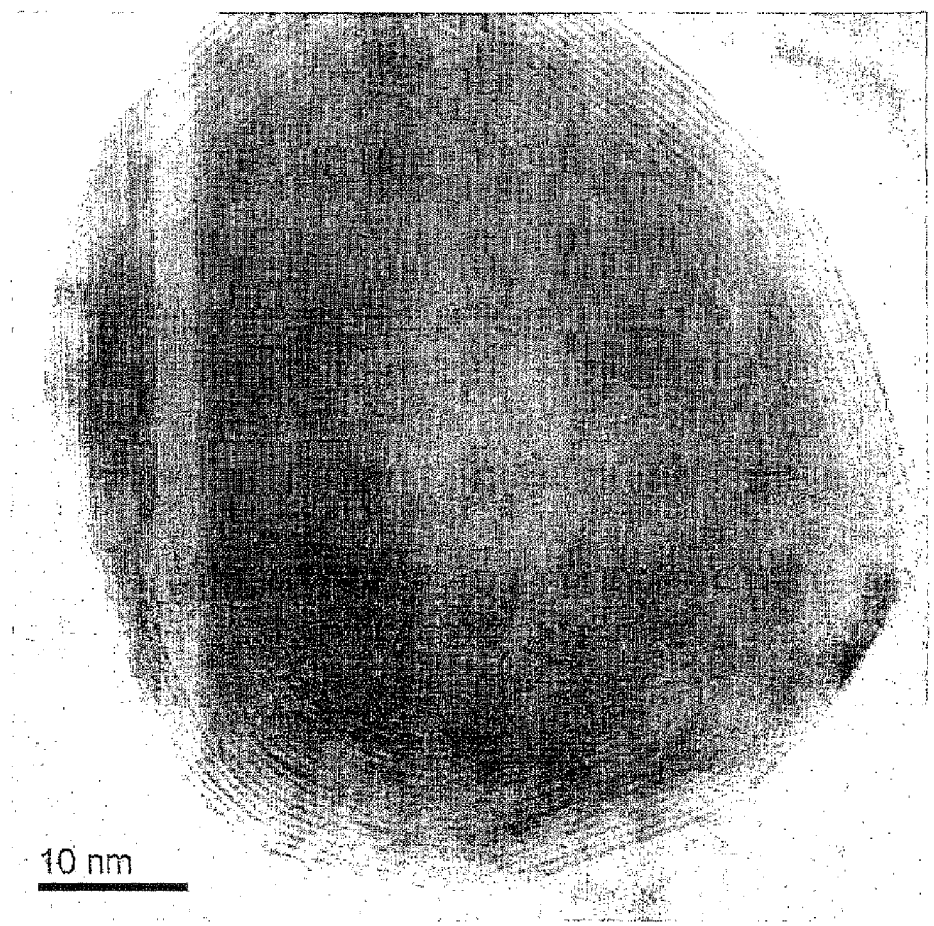

FIG. 8 shows the $WS_2$ nanoparticle obtained from $WCl_5$ precursor in a vertical reactor.

Figure 9:
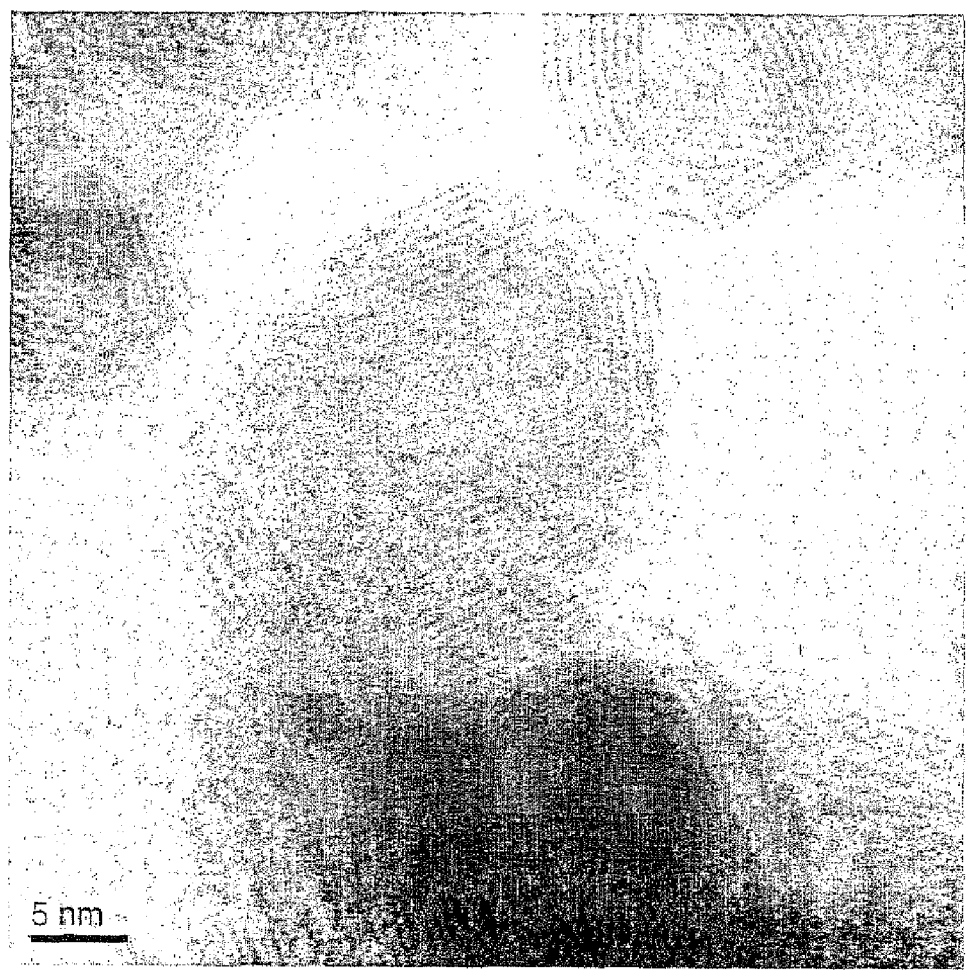
Figure 10:
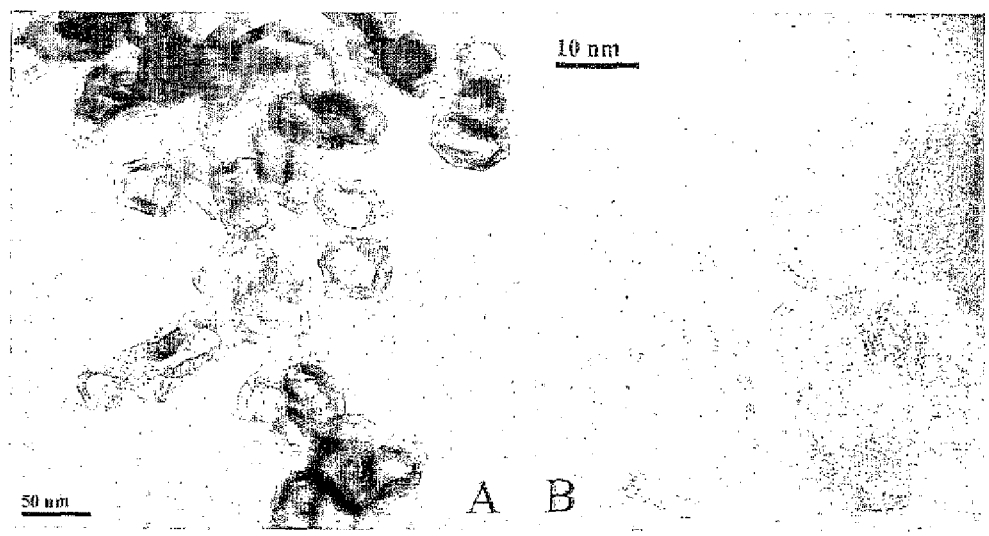

FIG. 9 is a TEM image of a small $WS_2$ nanoparticles obtained from $WCl_6$ in a vertical reactor FIG. 10A is a TEM image of a group of $MoS_2$ nanoparticles obtained from $MoCl_5$ in a vertical reactor.

FIG. 10B is a TEM image of small (20 nm) IF-$MoS_2$ obtained from $MoCl_5$ in a vertical reactor.

Figure 11:
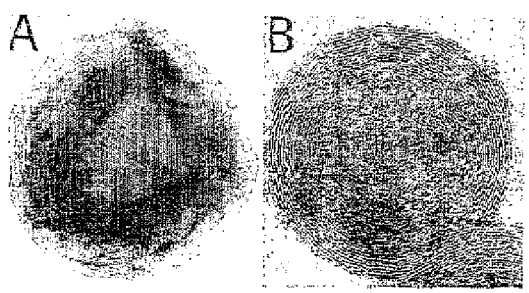

FIG. 11A shows IF-$WS_2$ synthesized from $WO_3$ by methods known in the art.

FIG. 11B shows IF-$TiS_2$ synthesized from $TiCl_4$. Each nanoparticle has a diameter ca. 60 nm.

Note the difference between FIGS. 11A and 11B in topology, number of layers and the absence of a hollow core in IF-$TiS_2$.

DETAILED DESCRIPTION OF THE INVENTION

The principles of the process of the present invention will be explained hereinbelow with reference to the preparation of closed-cage IF nanoparticles of $TiS_2$. However, it should be understood that the discussion is not limited to that specific material but it applies to IF metal chalcogenides in general.

IF nanoparticles of $TiS_2$ were synthesized through the reaction of $TiCl_4$ and $H_2S$. The obtained nanoparticles have no or very small hollow core and they consist of 80-100 molecular sheets with quite a perfect spherical shape. The IF nanoparticles were prepared by two reactor assemblies: a horizontal reactor and a vertical reactor.

Figure 1:
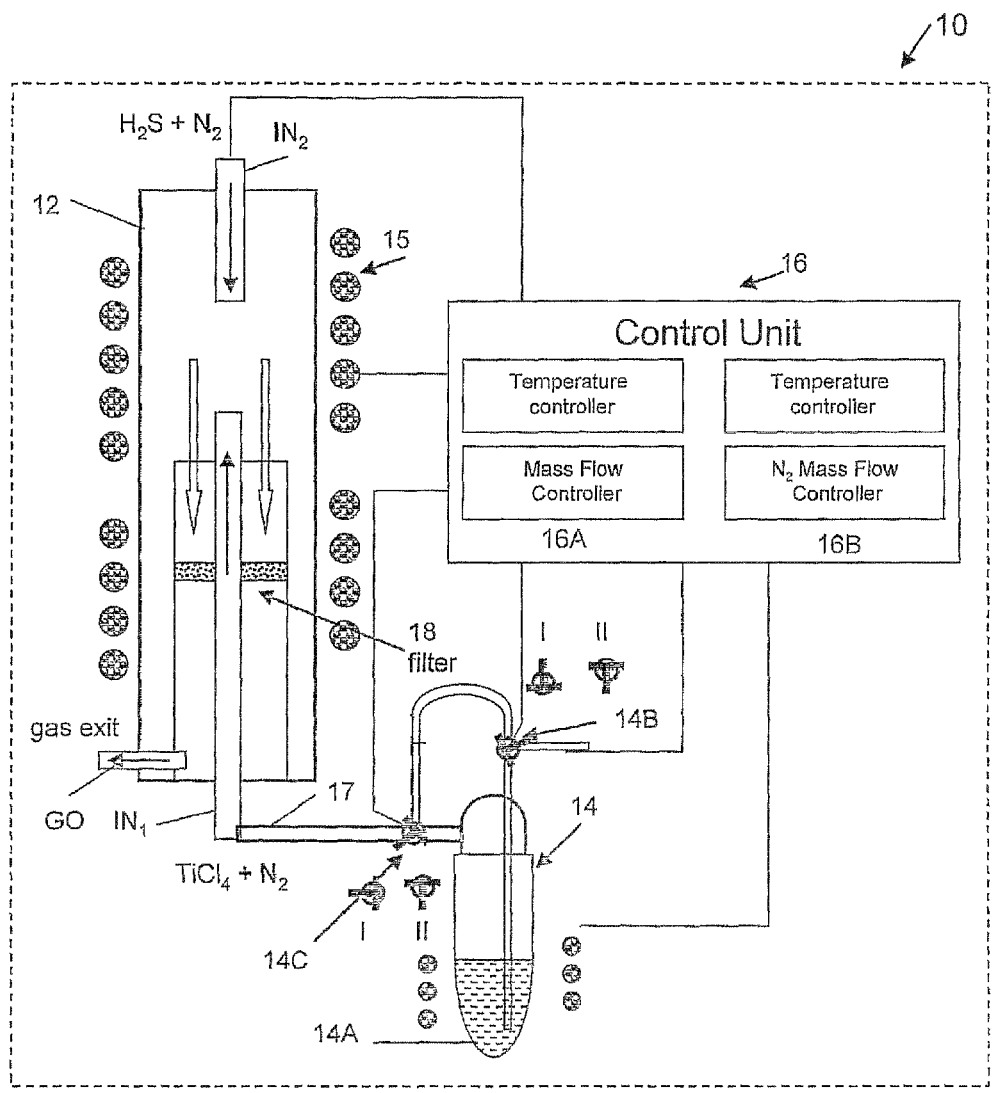
FIG. 1 exemplifies a preferred configuration of an apparatus of the present invention utilizing a vertical reaction chamber associated with a separate evaporation chamber.

Reference is made to FIG. 1 exemplifying a preferred configuration of an apparatus, generally designated 10, of the present invention suitable to be used for synthesis of IF-nanoparticles with expected superior tribological behavior. The apparatus 10 includes a vertical reaction chamber 12 for mounting into an oven 15, a separate evaporation chamber 14, and a control unit 16. An outlet 17 of the evaporation chamber 14 is connectable to an inlet $IN_1$ of the reaction chamber 12 via a connecting gas-flow pipe (not shown here).

In the present example, the oven 15 is designed as a two-zone oven, operable to control the temperature profile in the reaction chamber. The reaction chamber 12 has independent inlets $IN_1$ and $IN_2$ at opposite ends of the chamber 12 for inputting two reaction gases (agents), respectively, e.g., $TiCl_4$ and $H_2S$, and a gas outlet GO. Flows of these reaction agents in opposite directions towards a reaction zone in the reaction chamber are assisted by inert gas, $N_2$, and a mixture of $TiCl_4$ and $H_2S$ gases is formed in the reacting zone. The control unit 16 includes, inter alia, a mass flow controller 16A (e.g., TYLAN model FC260 commercially available from Tylan General, USA) operable for controlling the flow-rate of $H_2S$, and a suitable flow controller 16B for controlling the flow of additional gas to dilute the $H_2S$ by mixing it with a stream of inert gas or inert gas mixed with a reducing agent. Further provided in the apparatus 10 is a filter 18 appropriately configured and accommodated to collect the product (nanoparticles). The filter 18 is preferably spatially separated from the inner walls of the reaction chamber 12.

The precursor ($TiCl_4$) vapors were prepared in advance in the separate evaporation chamber 14. The latter includes a gas-washing bottle 14A, a temperature source (not shown here) appropriately accommodated adjacent to the bottle 14A and operable to controllably heat the $TiCl_4$ liquid while in the bottle 14A. Valve arrangements 14B and 14C are provided to present a bypass for the nitrogen flow. This bypass provides a flow of clean nitrogen instead of one enriched with $TiCl_4$ at certain moments of reaction. This improves the synthetic procedure since it prevents the flow of the highly reactive $TiCl_4$ precursor during the heating up and cooling down steps of the synthesis. To this end, each valve is shiftable (either by an operator or automatically) between its position I (used for flushing the apparatus with pure nitrogen gas) and its position II (used for stopping the flush of the pure nitrogen gas) during the reaction. The precursor ($TiCl_4$) vapor was carried from the evaporation chamber 14 to the reaction chamber 12 by an auxiliary gas flow. The carrier gas is inert gas, which can be mixed with a reducing agent ($H_2$ or/and CO).

The control unit 16 is configured for controlling the gas flows and the temperature sources' operation. The preheating temperature was found to be a very significant factor, determining the amount of precursor supplied to the reaction chamber 12. The flow-rate of nitrogen through the bottle 14A affects the stream of the titanium tetrachloride precursor as well.

This two-chamber design apparatus with the vertical configuration of the reaction chamber considerably improves the size and shape control of the synthesized nanoparticles. The nucleation and growth mechanism established with the vertical reaction chamber (FIG. 1) provide nanoparticles with quite a perfect spherical shape; small or no hollow core and many layers, which are ideally suited for alleviating friction and wear, as well as other different applications such as ultra strong nanocomposites, very selective and reactive catalysts, photovoltaic solar cells, etc.

Using similar reactions, the nucleation and growth mechanism is likely to provide many other kinds of IF nanoparticles with expected superior tribological behavior.

Figure 2:
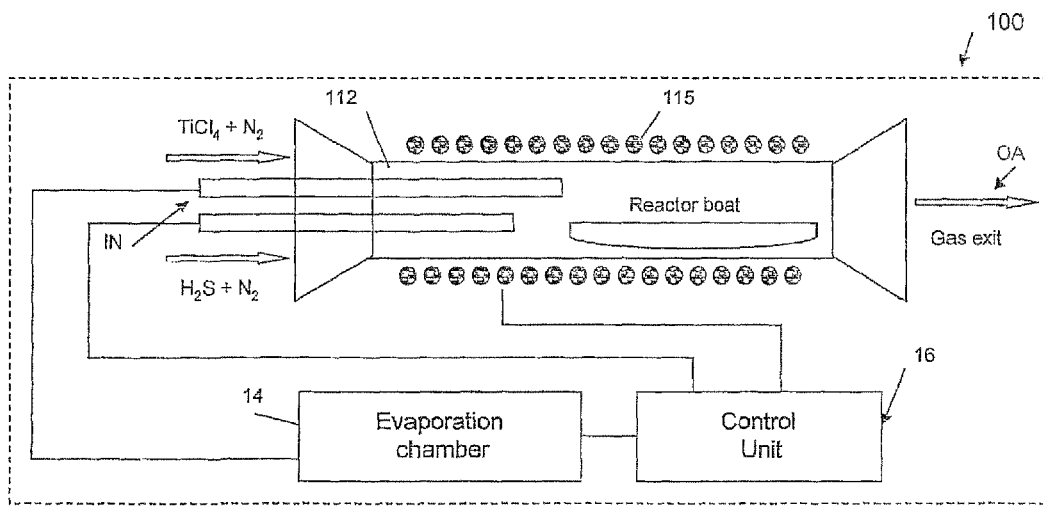
FIG. 2 is a schematic illustration of an apparatus utilizing a horizontal reaction chamber.

FIG. 2 shows another example of an apparatus, generally at 100. The apparatus 100 includes a horizontal reaction chamber 112 associated with a single-zone oven 115, and a separate evaporation chamber 14 configured as described above. The reaction chamber 112 has an inlet arrangement IN (for inputting reaction agents $TiCl_4$ and $H_2S$) and an outlet arrangement OA. A control unit 16 is used for controlling the operation of the oven 115 to thereby control the temperature profile in the reaction chamber 112. The flow-rate of $H_2S$, as well as that of $N_2$, is appropriately controlled as described above. The $TiCl_4$ vapors were obtained by preheating the liquid $TiCl_4$ in a gas-washing bottle (evaporation chamber). The $TiCl_4$ vapor is carried from the evaporation chamber 14 to the reaction chamber 112 by an auxiliary $N_2$ gas flow. The resulting product ($TiS_2$ powder) is collected for analysis on the surface of the reaction chamber.

EXAMPLES

Example 1

Preparation of IF-$TiS_2$ Nanoparticles in the Vertical Reactor Based Apparatus of FIG. 1

In order to maintain a water and oxygen free atmosphere, the reaction chamber 12 was permanently maintained at 500° C. and a flow of $N_2$ gas (20 ml/min) until shortly before the run starts, when it is withdrawn from the oven 15. At this point, the reaction chamber 12 was opened and cleaned. At the beginning of the process, the reaction chamber 12 was closed hermetically from outside the oven, and the reaction gases, except for precursor (titanium tetrachloride), were supplied to the inlets flushing the system for 10-15 min. The slight overpressure (ca. 1.1 bars) was maintained at a constant value by the gas trap in the exit GO of the gases from the reaction chamber 12. This procedure eliminates most of the residual atmospheric gases, like water vapor and oxygen from the reaction chamber. This step is very important for the synthesis, since both the final product ($TiS_2$) and especially the precursor ($TiCl_4$) are very sensitive to moisture. Subsequently, the reactor was inserted into the oven 15.

Independent inlets $IN_1$ and $IN_2$ for both reaction gases i.e. $TiCl_4$ and $H_2S$ were used, with the mixture of the reagents being formed in the reaction chamber itself. The flow-rate of $H_2S$ (3-20 cc/min) was controlled by means of a TYLAN model FC260 mass flow-controller 16A. The $H_2S$ was diluted by mixing this gas with a stream of $N_2$ gas (10-200 cc/min in this reaction) using another flow-controller 16B. The $TiCl_4$ vapors were obtained by preheating the liquid $TiCl_4$ in the gas-washing bottle 14A of the evaporation chamber 14. The $TiCl_4$ vapor was carried to the reaction chamber 12 by an auxiliary $N_2$ gas flow. The temperature of the $TiCl_4$ source was kept usually between 100 and 130° C., which is close to its boiling point of 136.5° C. As indicated above, the preheating temperature is a significant factor, determining the amount of precursor supplied to the reaction zone. The flow-rate of nitrogen through the bottle 14A (10-100 cc/mill) affects the stream of the titanium tetrachloride precursor as well. A small overpressure (1.1 bar) was maintained by using a gas trap filled with NaOH (5%) solution in the gas outlet of the reactor.

The temperature in the reaction chamber zone, where the two gases ($TiCl_4$ and $H_2S$) mix and react, and near the filter 18 was usually varied between 650-750° C. This temperature was chosen based on the properties of the Ti-S system.

Several experiments have been run at higher temperatures (up to 800° C.) in the reaction chamber.

The reaction started with the flow of $TiCl_4$ vapor for 30-60 min and was interrupted by terminating the preheating of the $TiCl_4$ precursor and using the bypass system, which provides continuous N, flow for flushing the system. A short annealing period (10-15 min) followed, allowing the last portions of the supplied titanium tetrachloride precursor to react completely. Afterwards, the reactor was moved down for cooling. The main portion of the synthesized material was collected on the filter. In addition, small portions of the product powder were found sticking to the surfaces of the quartz reactor.

Example 2

Preparation of Fullerene-like Nanostructures of $TiS_2$ in a Horizontal Reactor Based Apparatus of FIG. 2

The reaction chamber 112 was cleaned in a similar manner as described in Example 1 above in order to maintain a water and oxygen free atmosphere. Subsequently, the reaction chamber was inserted into the oven 115.

The temperature in the horizontal reaction chamber 112 was controlled by means of a single-zone oven 115. The $TiCl_4$ vapor was prepared in the separate evaporation chamber (14 in FIG. 1) and supplied to the reaction chamber 112 in the similar way as was done in the above-described Example 1. The temperature of the reaction chamber 112, where the two gases ($TiCl_4$ and $H_2S$) mix and react, was varied in the range of 650-750° C. The resulting $TiS_2$ powder was collected for analysis on the surface of the reactor boat. However, the product collection was impeded as the product was swept by the carrier gas to the trap.

Example 3

Preparation of Fullerene-like Nanostructures of $WS_2$ in a Horizontal Reactor Based Apparatus of FIG. 2

The reaction chamber 112 was cleaned in a similar manner as described in Example 1 above in order to maintain a water and oxygen free atmosphere. Subsequently, the reaction chamber was inserted into the oven 115.

The temperature in the horizontal reaction chamber 112 was controlled by means of a single-zone oven 115. The chosen precursor $WO_2Cl_2$ was heated up to 270-290° C. in the separate evaporation chamber (14 in FIG. 1) and its vapor was supplied to the reaction chamber 112 in the similar way as was done in the above-described Example 1. The temperature of the reaction chamber 112, where the two gases (metal-containing precursor and $H_2S$) mix and react, was varied in the range of 700-850° C. A small overpressure (1.1 bar) was maintained by using a gas trap filled with NaOH (5%) solution in the gas outlet of the reaction chamber.

The resulting $WS_2$ powder was collected for analysis on the surface of the reactor boat. However, the product collection was impeded as the product was swept by the carrier gas to the trap. The resulting nanoparticles are shown in FIG. 6. As can be noted, the IF-$WS_2$ obtained in the present example are not so perfect and have hollow core. This can be explained by the inhomegenity of the reaction parameters in the chosen horizontal reactor.

In other experiments the forming gas, containing 1-10% of $H_2$ in $N_2$, was used instead of clean nitrogen for either caring the metal-containing precursor or diluting the $H_2S$.

Furthermore, similar series of experiments were carried out using horizontal reactors starting with $WBr_5$ (boils at 333° C., preheated at 290-330° C.). Different combinations of carrier gas (clear nitrogen or hydrogen-enriched nitrogen) were used. The resulting material consisted from IF-nanoparticles together with byproducts (platelets amorphous materials), as revealed by TEM analysis. Different nanoparticles both hollow-core and non-hollow core were observed.

Example 4

Preparation of IF-$WS_2$ Nanoparticles in the Vertical Reactor Based Apparatus of FIG. 1

At the beginning of the process, the reaction chamber 12 was closed hermetically from outside the oven, and the reaction gases, except for precursor ($WBr_5$), were supplied to the inlets flushing the system for 10-15 min. The slight overpressure (ca. 1.1 bars) was maintained at a constant value by the gas trap in the exit GO of the gases from the reaction chamber 12. Subsequently, the reactor was inserted into the oven 15.

Independent inlets $IN_1$ and $IN_2$ for both reaction gases i.e. $WBr_5$ and $H_2S$ were used, with the mixture of the reagents being formed in the reaction chamber itself. The $H_2S$ (3-20 cc/min) was mixed with a stream of $N_2$ gas (10-200 cc/min in this reaction). The $WBr_5$ vapors were obtained by preheating the $WBr_5$ precursor in the gas-washing bottle 14A of the evaporation chamber 14 and were carried to the reaction chamber 12 by an auxiliary $N_2$ gas flow. The temperature of the $WBr_5$ source was kept usually between 290 and 330° C., which is close to its boiling point of 333° C. A small overpressure (1.1 bar) was maintained by using a gas trap filled with NaOH (5%) solution in the gas outlet of the reaction chamber.

The temperature in the reaction chamber zone, where the two gases ($WBr_5$ and $H_2S$) mix and react, and near the filter 18 was usually varied between 700-850° C.

The main portion of the synthesized material was collected on the filter. In addition, small portions of the product powder were found sticking to the surfaces of the quartz reaction chamber.

Example 5

Preparation of IF-MoS$_2$ Nanoparticles in the Vertical Reactor Based Apparatus of FIG. 1

At the beginning of the process, the reaction chamber 12 was closed hermetically from outside the oven, and the reaction gases, except for precursor (Mo(CO)$_5$), were supplied to the inlets flushing the system for 10-15 min. Subsequently, the reaction chamber was inserted into the oven 15.

Independent inlets IN$_1$ and IN$_2$ for both reaction gases i.e. Mo(CO)$_5$ and H$_2$S were used, with the mixture of the reagents being formed in the reaction chamber itself. The H$_2$S (3-20 cc/min) was mixed with a stream of N$_2$ gas (10-200 cc/min in this reaction). The Mo(CO)$_5$ vapors were obtained by preheating the liquid Mo(CO)$_5$ in the gas-washing bottle 14A of the evaporation chamber 14 and was carried to the reaction chamber 12 by an auxiliary N$_2$ gas flow. The temperature of the Mo(CO)$_5$ source was kept usually between 160 and 200° C., which is over its melting point of 150° C.

The temperature in the reaction chamber zone, where the two gases (Mo(CO)$_5$ and H$_2$S) mix and react, and near the filter 18 was usually varied between 650-850° C.

The main portion of the synthesized material was collected on the filter. In addition, small portions of the product powder were found sticking to the surfaces of the quartz reactor.

Example 6

Preparation of IF-WS$_2$ Nanoparticles in the Vertical Reactor Based Apparatus of FIG. 1

At the beginning of the process, the reaction chamber 12 was closed hermetically from outside the oven, and the reaction gases, except for precursor (WCl$_4$), were supplied to the inlets flushing the system for 10-15 min. The slight overpressure (ca. 1.1 bars) was maintained at a constant value by the gas trap in the exit GO of the gases from the reaction chamber 12. Subsequently, the reactor was inserted into the oven 15.

Independent inlets IN$_1$ and IN$_2$ for both reaction gases i.e. WCl$_4$ and H$_2$S were used, with the mixture of the reagents being formed in the reaction chamber itself. The H$_2$S (3-20 cc/min) was mixed with a stream of N$_2$ gas (10-200 cc/min in this reaction). The WCl$_4$ vapors were obtained by preheating the precursor in the gas-washing bottle 14A of the evaporation chamber 14 and were carried to the reaction chamber 12 by an auxiliary N$_2$ gas flow. The temperature of the WCl$_4$ source was kept usually between 200 and 400° C. in order to provide the necessary amount of precursor supplied to the reaction. A small overpressure (1.1 bar) was maintained by using a gas trap filled with NaOH (5%) solution in the gas outlet of the reaction chamber.

The temperature in the reaction chamber zone, where the two gases (WCl$_4$ and H$_2$S) mix and react, and near the filter 18 was usually varied between 700-850° C.

The main portion of the synthesized material was collected on the filter. In addition, small portions of the product powder were found sticking to the surfaces of the quartz reaction chamber.

Example 7

Preparation of IF-WS$_2$ Nanoparticles in the Vertical Reactor Based Apparatus of FIG. 1

At the beginning of the process, the reaction chamber 12 was closed hermetically from outside the oven, and the reaction gases, except for precursor (WCl$_5$), were supplied to the inlets flushing the system for 10-15 min. The slight overpressure (ca. 1.1 bars) was maintained at a constant value by the gas trap in the exit GO of the gases from the reaction chamber 12. Subsequently, the reactor was inserted into the oven 15.

Independent inlets IN$_1$ and IN$_2$ for both reaction gases i.e. WCl$_5$ and H$_2$S were used, with the mixture of the reagents being formed in the reaction chamber itself. The H$_2$S (3-20 cc/min) was mixed with a stream of N$_2$ gas (10-200 cc/min in this reaction). The WCl$_5$ vapors were obtained by preheating the WCl$_5$ precursor in the gas-washing bottle 14A of the evaporation chamber 14 and were carried to the reaction chamber 12 by an auxiliary N$_2$ gas flow. The temperature of the WCl$_5$ source was kept usually between 250 and 285° C. A small overpressure (1.1 bar) was maintained by using a gas trap filled with NaOH (5%) solution in the gas outlet of the reaction chamber.

The temperature in the reaction chamber zone, where the two gases (WCl$_5$ and H$_2$S) mix and react, and near the filter 18 was usually varied between 700-850° C.

Since the formal valence of tungsten in the precursor (WCl$_5$) differs from the one in the expected product (WS$_2$), additional reduction of metal was required. The excess of H$_2$S in the reaction atmosphere acts as the reduction agent, however in part of the experiments additional flow of H$_2$ was used for this purpose. The additional flow of hydrogen (1-10% of hydrogen within nitrogen instead of pure N$_2$) was supplied either together with precursor or mixed with H$_2$S.

The main portion of the synthesized material was collected on the filter. In addition, small portions of the product powder were found sticking to the surfaces of the quartz reaction chamber.

Example 8

Preparation of IF-WS$_2$ Nanoparticles in the Vertical Reactor Based Apparatus of FIG. 1

At the beginning of the process, the reaction chamber 12 was closed hermetically from outside the oven, and the reaction gases, except for precursor (WCl$_6$), were supplied to the inlets flushing the system for 10-15 min. The slight overpressure (ca. 1.1 bars) was maintained at a constant value by the gas trap in the exit GO of the gases from the reaction chamber 12. Subsequently, the reactor was inserted into the oven 15.

Independent inlets IN$_1$ and IN$_2$ for both reaction gases i.e. WCl$_6$ and H$_2$S were used, with the mixture of the reagents being formed in the reaction chamber itself. The H$_2$S (3-20 cc/min) was mixed with a stream of N$_2$ gas (10-200 cc/min in this reaction). The WCl$_6$ vapors were obtained by preheating the WCl$_6$ precursor in the gas-washing bottle 14A of the evaporation chamber 14 and were carried to the reaction chamber 12 by an auxiliary N$_2$ gas flow. The temperature of the WCl$_6$ source was kept usually between 275 and 345° C. A small overpressure (1.1 bar) was maintained by using a gas trap filled with NaOH (5%) solution in the gas outlet of the reaction chamber.

The temperature in the reaction chamber zone, where the two gases (WCl$_6$ and H$_2$S) mix and react, and near the filter 18 was usually varied between 700-850° C.

Since the formal valence of tungsten in the precursor (WCl$_6$) differs from the one in the expected product (WS$_2$), additional reduction of metal was required. The excess of H$_2$S in the reaction atmosphere acts as the reduction agent, however in part of the experiments additional flow of H$_2$ was used for this purpose. The additional flow of hydrogen (1-10% of hydrogen within nitrogen instead of pure $N_2$) was supplied either together with precursor or mixed with a $H_2S$.

The main portion of the synthesized material was collected on the filter. In addition, small portions of the product powder were found sticking to the surfaces of the quartz reaction chamber.

Example 9

Preparation of IF-$MoS_2$ Nanoparticles in the Vertical Reactor Based Apparatus of FIG. 1

At the beginning of the process, the reaction chamber 12 was closed hermetically from outside the oven, and the reaction gases, except for precursor ($MoCl_5$), were supplied to the inlets flushing the system for 10-15 min. The slight overpressure (ca. 1.1 bars) was maintained at a constant value by the gas trap in the exit GO of the gases from the reaction chamber 12. Subsequently, the reactor was inserted into the oven 15.

Independent inlets $IN_1$ and $IN_2$ for both reaction gases i.e. $MoCl_5$ and $H_2S$ were used, with the mixture of the reagents being formed in the reaction chamber itself. The $H_2S$ (3-20 cc/min) was mixed with a stream of $N_2$ gas (10-200 cc/min in this reaction). The $MoCl_5$ vapors were obtained by preheating the precursor in the gas-washing bottle 14A of the evaporation chamber 14 and were carried to the reaction chamber 12 by an auxiliary $N_2$ gas flow. The temperature of the $MoCl_5$ source was kept usually between 200 and 265° C. A small overpressure (1.1 bar) was maintained by using a gas trap filled with NaOH (5%) solution in the gas outlet of the reaction chamber.

The temperature in the reaction chamber zone, where the two gases ($MoCl_5$ and $H_2S$) mix and react, and near the filter 18 was usually varied between 700-850° C.

Since the formal valence of tungsten in the precursor ($MoCl_5$) differs from the one in the expected product ($WS_2$), additional reduction of metal was required. The excess of $H_2S$ in the reaction atmosphere acts as the reduction agent, however in part of the experiments additional flow of $H_2$ was used for this purpose. The additional flow of hydrogen (1-10% of hydrogen within nitrogen instead of pure $N_2$) was supplied either together with precursor or mixed with a $H_2S$.

The main portion of the synthesized material was collected on the filter. In addition, small portions of the product powder were found sticking to the surfaces of the quartz reaction chamber.

Analysis of the Synthesized Materials

The products were analyzed mainly by means of various electron microscopy techniques. The following microscopes were used: environmental scanning electron microscope (Philips FEI-XL30 E-SEM); transmission electron microscope (Philips CM120 TEM), equipped with EDS detector (EDAX-Phoenix Microanalyzer); high resolution transmission electron microscope (HRTEM) with field emission gun (FEI Technai F30), equipped with a parallel electron energy loss spectrometer (Gatan imaging filter-GIF (Gatan)). Simulation of the HRTEM micrographs of $TiS_2$ was obtained using the MacTempas image-simulation software. Complementary analyses were carried, out by powder X-ray diffraction (XRD).

Figure 3:
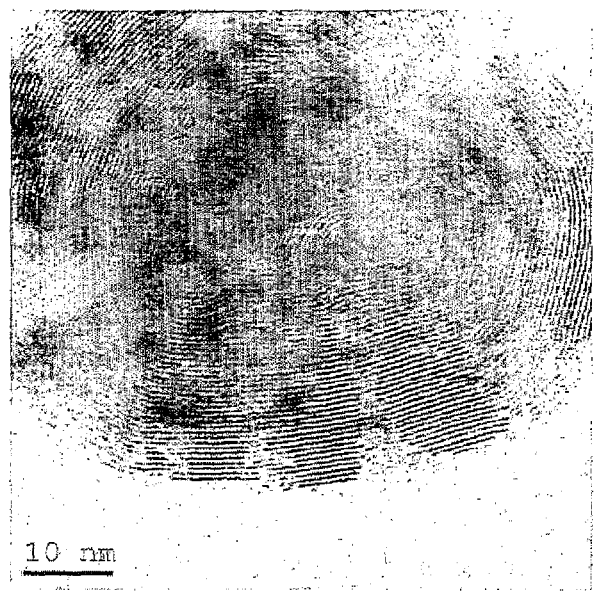
FIG. 3 is the TEM image of IF-$TiS_2$ nanoparticle, produced in a horizontal reactor.

TEM examination of the powder obtained in the horizontal set-up (Example 2) revealed the presence of closed cage nanostructures in the product (FIG. 3). The typically observed particle-size was about 100 nm, with nanoparticles ranging in size between 50 and 150 nm. The wide size distribution is a reflection of the inhomogenity of the reaction conditions in this set-up. The yield of the closed-cage nanoparticles in those experiments was up to 30%, depending on the reaction conditions. The remaining material, as revealed by SEM and TEM, was made of $TiS_2$ platelets, a few tens of nanometers to 0.5 micron in size, each.

Figure 4:
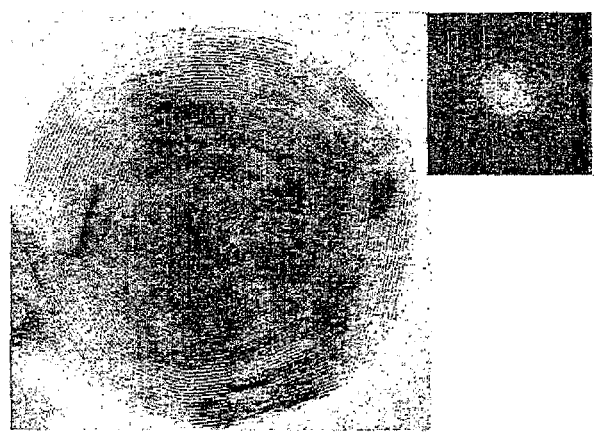
FIG. 4 is the TEM image of a typical IF-$TiS_2$ nanoparticle, produced in a vertical reactor. The interlayer distance is 5.8 Å and the diameter of the nanoparticie is larger than 70 nm.

The product of the vertical set-up (Example 1) was found to contain an appreciably larger fraction of the IF-$TiS_2$ phase with yields approaching 80%. Furthermore, the size distribution of the synthesized nanoparticles was found to be appreciably narrower in the vertical set-up, as compared to the horizontal reactor. The product of the vertical reactor ended up also to be more spherical (FIG. 4). Tilting the sample in different viewing angles did not reveal any significant changes in the shape of the observed nanoparticles. These findings emphasize the advantage of using the vertical set-up for the synthesis of the IF-nanophase materials. Varying the synthesis time did not seem to have an appreciable influence on the size distribution of the IF-$TiS_2$ nanoparticles.

The resulting IF-nanoparticles were found to consist of a large number of concentric layers displaying relatively smooth curvature. For instance, the nanoparticle shown in FIG. 4 consists of approximately 80 concentric and spherical layers. These layers were continuous with no visible holes or edge dislocations observed. The hollow core, which was observed in the IF-$WS_2$ ($MoS_2$) nanoparticles, did not exist in the present nanoparticles. A careful examination of the synthesized nanoparticles did not reveal a spiral growth mode of the molecular layers of the material. Instead, a quasi-epitaxial, layer by layer growth mode could be deciphered. The observed layers are complete and are separated one from the others.

In several cases the cores of the observed $TiS_2$ nanoparticles were found to be made of a number of tiny spherical IF centers, which are stacked together. As a rule, such nanoparticles were preferably found in the experiments with definitely higher flow rate of $TiCl_4$ precursor (preheating at 130-140° C.). For instance several such centers are visible in the TEM image of the nanoparticle shown in FIG. 3. The borders between those nuclei can be clearly distinguished in the core of the nanoparticle, while the peripheral layers envelope the divided core into a single spherical moiety.

HRTEM image of a part of a closed $TiS_2$ fullerene-like nanoparticle is shown in FIG. 5A together with its simulated image. A satisfactory agreement between the real and simulated images is indicative of the correct assignment of the nanoparticle's structure. It should be nonetheless noted, that the simulation refers to the bulk (1T) material, which is flat, while the IF-$TiS_2$ nanoparticles are curved and their structure is not fully commensurate, because the number of atoms is different in each of the concentric nested layers.

The interlayer distance obtained from either Fourier analysis (insert of FIG. 4), or a direct measurement (FIG. 5B) was found to be 0.58 nm. This value represents an expansion of about 1.8% in comparison to the layer to layer separation in bulk 1T-$TiS_2$ (0.57 nm). The interlayer distance did not seem to vary along the entire volume of the nanoparticle. This result is in a good agreement with XRD experiments, in which the synthesized material was identified as 1T-$TiS_2$. It nevertheless stands in a sharp contrast with the synthesized IF-$WS_2$ and $MoS_2$ nanoparticles, synthesized by reacting $H_2S$ with the respective oxides, were often large gaps are observed between the molecular sheets. These gaps can be associated with strain-induced brisk changes in the topology of the layers from evenly folded to faceted structure. This topology was found to be typical for nanoparticles which are produced by the reaction of $H_2S$ with the respective oxide, which starts on the surface of the nanoparticle and progresses inwards consuming the oxide core.

At high temperature experiments (800° C.), nanoparticles having distorted shape were observed. Also, the overall yield of the IF-TiS$_2$ at high temperatures was low (app. 10%), the main portion being TiS$_2$ platelets.

A number of other precursors were tested for their aptitude to obtain fullerene-like materials in similar way. The resulting nanoparticles of both MoS$_2$ and WS$_2$ (FIGS. 6-10) were obtained from variety of starting materials. Most of the newly-obtained nanoparticles were found to differ from their analogs, obtained by reduction-sulfidization of oxide templates. More specifically, the nanoparticles obtained from the vapors of metal-containing precursors were more spherical, with little amount of defects. Moreover, they had a small hollow core, if any, like it was found in the case of TiS$_2$.

Tribological Experiments

A ball on flat tester[1] was used for the present tribological experiments. A load of 50 grams was used in these experiments. The friction coefficient was measured in the end of the 20 cycles run, were steady tribological regime prevailed.

To test the efficacy of the IF-TiS$_2$ particles produced by the process of the present invention, as a solid lubricant a series of tribological experiments were conducted. It was found that the addition of a small amount (1%) of the IF-TiS$_2$ powder decreases significantly (10 times) the friction coefficient of the pure oil-from 0.29 to 0.03. A similar test with 1% bulk powder (1T-TiS$_2$) added to the oil, leads to a friction coefficient of 0.07, i.e. twice that of the IF-phase. It must be emphasized here that the portion used for the tribological tests contained no more than 50% IF-TiS$_2$, the rest being platelets of 1T-TiS$_2$. The collected data suggests that the shape of the IF-TiS$_2$ of the invention might play a major role in lowering the friction coefficient. The quite perfectly spherical nanoparticles with sizes ranging in the 30-70 nm and up to 100 molecular layers thick obtained with the vertical set-up could provide effective rolling friction and sliding. It is emphasized the important role played by the spherical shape of the nanoparticles in providing rolling friction with a reduced friction coefficient and wear. These nanoparticles are also stable and compliant.

Comparison between if Nanoparticles Obtained in the Process of the Present Invention and Known if Nanoparticles:

The IF-TiS$_2$ nanoparticles obtained by the process of the present invention in a vertical reactor, typically consist of about hundred layers and are formed fast, over a period of a few minutes or less, only. They are spherical in shape, and their lattice parameter (c) is constant along the radial axis of the nanoparticle, which suggests that they suffer from relatively minor strain. Table 2 together with FIG. 11 make a concise comparison between the morphology and some of the properties of the IF-TiS$_2$ nanoparticles obtained by the process of the present invention and IF-WS$_2$ nanoparticles obtained by processes known in the art.

The following Table 2 compares the representative characteristics of fullerene-like WS$_2$ obtained by the known reaction of H$_2$S gas with tungsten oxide nanoparticles, and TiS$_2$ nanoparticles obtained from titanium chloride vapor according to the present invention.

TABLE 2

Comparison between representative characteristics of IF—WS$_2$ obtained by the known reaction and IF—TiS$_2$ nanoparticles obtained by the process of the present invention.

|  | IF—TiS$_2$ | IF—WS$_2$ |
| --- | --- | --- |
| Typical size | 60-100 nm | 60-200 nm |

TABLE 2-continued

Comparison between representative characteristics of IF—WS$_2$ obtained by the known reaction and IF—TiS$_2$ nanoparticles obtained by the process of the present invention.

|  | IF—TiS$_2$ | IF—WS$_2$ |
| --- | --- | --- |
| Number of layers | 50-120 | 20-30 |
| Core | No core or very small core observed | Empty hollow core |
| Overall shape of the nanoparticle | Substantially spherical | Partially faceted, not spherical |
| Estimated growth duration | Minutes | Hours |
| Growth mechanism | Nucleation and growth | Synergetic sulfidization and reduction; diffusion controlled |

In contrast to the earlier synthesized IF-WS$_2$ (MoS$_2$)[5-7], the closed-cage nanoparticles of titanium disulfide produced by the process of the present invention have a very small hollow core or do not possess such core. The interlayer distance (0.58 nm) is preserved along the entire volume of the nanoparticle. The present results are indicative of the fact that the titanium disulfide layers start to grow from a small nuclei, obeying thereby the ubiquitous nucleation and growth mechanism. The present synthesis of IF-TiS$_2$ may be envisaged as a homogeneous nucleation of the fullerene-like structures from embryonic clusters formed in the vapor phase, in contrast to the heterogeneous nucleation of IF-WS$_2$ (MoS$_2$) on the surfaces of the respective oxide templates.

The vapor of TiCl$_4$ crosses the flux of H$_2$S, coming out from an oppositely placed tube at relatively high temperature (650-750° C.), which provides a high reaction rate. Since the TiS$_2$ clusters formed in the gas phase are non-volatile, they condense into small nuclei. It is well established that shrinking the size of the graphene (or other layered material-like TiS$_2$) sheet makes the planar structure unstable resulting in folding and formation of a closed-cage structure. Once such closed-cage nuclei of TiS$_2$ are formed in the vapor phase of the reactor further TiCl$_4$ adsorb on its surface and react with the H$_2$S gas. This reaction occurs in a highly controlled-quasi-epitaxial fashion, i.e. with a single growth front leading to a layer by layer growth mode. This growth mode entails minimal geometrical constraints, and hence the nanoparticles are appreciably more spherical than the previously reported IF nanoparticles. The spherical morphologies with relatively smooth curvature exhibited by these nanoparticles suggest that the bending of the molecular sheets results in continuously distributed dislocations or defects, in contrast to the more facetted structures, observed in the previously synthesized IF-WS$_2$, where the defects are localized in grain boundaries. The rather large number of layers observed in the IF-TiS$_2$ nanoparticles undergoing van der Waals interactions may compensate for the bending and dislocation energies and add to the stability of such spherical nanoparticles.

The small crystallites, formed during the initial stages of the gas-phase reaction collide in the vapor phase. When the kinetic energy of the collision is not sufficiently large to separate the colliding nanoparticles, they aggregate forming multi-nuclei cores. These aggregated nanoparticles serve as a template, which are subsequently enfolded by additional TiS$_2$ layers on their surface. A fullerene-like nanoparticle with multi-core is thus obtained (see FIG. 3). The fairly narrow size distribution of the IF-TiS$_2$ nanoparticles in the vertical set-up is particularly notable. Presently, two possible explanations for this effect can be invoked. Once the nanoparticles reach a critical size, which coincides with their thermodynamic stability, their growth rate slows down appreciably, while the smaller nuclei continue to grow fast until they reach a similar size. A further possible reason for the narrow size distribution is that the larger nanoparticles can not float in the vapor and they fall on the filter, where they are rapidly buried under the next layer of nanoparticles, and their growth slows down.

The constancy of the distance between the layers (c) in the radial direction, and their quite perfectly spherical shape indicate that the present IF nanoparticles suffer little strain, only. This phenomenon is the result of the nucleation and growth mechanism accomplished in the present invention, and it has a favorable impact on the tribological behavior of such nanoparticles.

Other IF metal chalcogenides, e.g. IF-$WS_2$ and $MoS_2$ nanoparticles, synthesized by a similar process as the above-exemplified one for $TiS_2$, provide similar spherical nanoparticles consisting of many layers (FIG. 6-10). It appears that the nanoparticles obtained from the vapors of metal-containing precursor follow the same growth mechanism (nucleation and growth). This topology favors rolling and sliding of the nanoparticles, providing improved tribological behavior for the IF solid lubricant. Since IF-$WS_2$ and $MoS_2$ are the materials of choice for such applications, the improved control of the nanoparticles morphology, as presented in the present invention for leads to a superior tribological behavior of these solid lubricants, too.

The invention claimed is:

1. A product comprising inorganic fullerene-like (IF) metal chalcogenide nanoparticles, the metal being selected from In, Ga, Sn and a transition metal, the transition metal being selected from Mo, W, V, Zr, Hf, Pt, Pd, Re, Nb, Ta, Ti, Cr and Ru, the nanoparticles comprising a plurality of molecular layers, a substantial portion of said nanoparticles having more than 40 molecular layers.

2. The product of claim 1, wherein the chalcogen is selected from S, Se or Te.

3. The product of claim 1, comprising the nanoparticles selected from $TiS_2$, $TiSe_2$, $TiTe_2$, $WS_2$, $WSe_2$, $WTe_2$, $MoS_2$, $MoSe_2$, $MoTe_2$, $SnS_2$, $SnSe_2$, $SnTe_2$, $RuS_2$, $RuSe_2$, $RuTe_2$, GaS, GaSe, GaTe, $In_2S_3$, $In_2Se_3$, $In_2Te_3$, InS, InSe, $Hf_2S$, $HfS_2$, $ZrS_2$, $VS_2$, $ReS_2$ and $NbS_2$.

4. The product of claim 1, being a nanocomposite comprising a mixture of the nanoparticles of at least two types selected from $TiS_2$, $TiSe_2$, $TiTe_2$, $WS_2$, $WSe_2$, $WTe_2$, $MoS_2$, $MoSe_2$, $MoTe_2$, $SnS_2$, $SnSe_2$, $SnTe_2$, $RuS_2$, $RuSe_2$, $RuTe_2$, GaS, GaSe, GaTe, $In_2S_3$, $In_2Se_3$, $In_2Te_3$, InS, InSe, $Hf_2S$, $HfS_2$, $ZrS_2$, $VS_2$, $ReS_2$ and $NbS_2$.

5. The product of claim 1 comprising a lubricant comprising the nanoparticles selected from $TiS_2$, $TiSe_2$, $TiTe_2$, $WS_2$, $WSe_2$, $WTe_2$, $MoS_2$, $MoSe_2$, $MoTe_2$, $SnS_2$, $SnSe_2$, $SnTe_2$, $RuS_2$, $RuSe_2$, $RuTe_2$, GaS, GaSe, GaTe, $In_2S_3$, $In_2Se_3$, $In_2Te_3$, InS, InSe, $Hf_2S$, $HfS_2$, $ZrS_2$, $VS_2$, $ReS_2$ and $NbS_2$.

6. The product of claim 1, wherein the nanoparticles have a diameter of about 10-300 nm.

7. The product of claim 1, wherein said nanoparticles have no or a very small hollow core.

8. A product comprising inorganic fullerene-like (IF) metal chalcogenide nanoparticles, the metal being selected from In, Ga, Sn and a transition metal, the transition metal being selected from Mo, W, V, Zr, Hf, Pt, Pd, Re, Nb, Ta, Ti, Cr and Ru, the nanoparticles comprising a plurality of molecular layers, an interlayer distance substantially not exceeding 1 nm.

9. The product of claim 8, being a nanocomposite comprising a mixture of the nanoparticles of at least two types selected from $TiS_2$, $TiSe_2$, $TiTe_2$, $WS_2$, $WSe_2$, $WTe_2$, $MoS_2$, $MoSe_2$, $MoTe_2$, $SnS_2$, $SnSe_2$, $SnTe_2$, $RuS_2$, $RuSe_2$, $RuTe_2$, GaS, GaSe, GaTe, $In_2S_3$, $In_2Se_3$, $In_2Te_3$, InS, InSe, $Hf_2S$, $HfS_2$, $ZrS_2$, $VS_2$, $ReS_2$ and $NbS_2$.

10. A lubricant comprising the inorganic fullerene-like (IF) metal chalcogenide nanoparticles, the metal being selected from In, Ga, Sn and a transition metal, the transition metal being selected from Mo, W, V, Zr, Hf, Pt, Pd, Re, Nb, Ta, Ti, Cr and Ru, the nanoparticles comprising a plurality of molecular layers, characterized by at least one of the following: a substantial portion of said nanoparticles have more than 40 molecular layers; and the nanoparticles have an interlayer distance substantially not exceeding 1 nm.

11. The product of claim 1, produced by the following process:
   (a) preparing a metal precursor vapor, selected from metal halide vapor, metal carbonyl vapor, organo-metallic compound vapor and metal oxyhalide vapor, in a separate evaporation chamber;
   (b) feeding the metal precursor vapor from said separate evaporation chamber into a reaction chamber to flow towards a reaction zone in said reaction chamber along a vertical path to interact with at least one chalcogen material in gas phase flowing towards said reaction zone in a vertical path, and controlling temperature conditions in said reaction zone such as to enable the formation of inorganic fullerene-like (IF) metal chalcogenide nanoparticle product.

12. The product of claim 11, wherein said chalcogen material is selected from $H_2S$, $H_2Se$ and $H_2Te$ and mixtures thereof.

13. The product of claim 11, wherein said process further comprises:
   controllably varying the flow of said metal precursor vapor into said reaction chamber to control the amount, morphology and size of the so-produced inorganic fullerene-like (IF) metal calcogenide nanoparticles in solid form, the flow of the vapor of the metal precursor being controlled by at least one of the following: (i) the rate of the flow of an inert gas driving said vapor into the reaction chamber; (ii) the temperature used for heating the metal precursor to obtain a vapor of said metal precursor.

14. The product of claim 11, wherein said metal precursor is selected from the following compounds:
   Chromium carbonyl, Chromium (III) iodide, Chromium (IV) chloride, Chromium (IV) fluoride, Chromium (V) fluoride, Chromium (VI) fluoride, Cromyl chloride, Trimethylgallium, Hafnium bromide, Hafnium chloride, Hafnium iodide, Trimethylindium, Molybdenum carbonyl, Molybdenum (V) chloride, Molybdenum (V) fluoride, Molybdenum (V) oxytrichloride, Molybdenum (VI) fluoride, Molybdenum (VI) oxytetrafluoride, Molybdenum (VI) oxytetrachloride, Molybdenum (VI) dioxydichloride, Niobium (IV) chloride, Niobium (IV) fluoride, Niobium (IV) iodide, Niobium (V) bromide, Niobium (V) chloride, Niobium (V) fluoride, Niobium (V) iodide, Niobium (V) oxybromide, Niobium (V) oxychloride, Niobium (V) dioxyfluoride, Palladium (II) bromide, Palladium (II) iodide, Platinum (II) bromide, Platinum (II) chloride, Platinum (II) iodide, Platinum (III) bromide, Platinum (III) chloride, Platinum (IV) bromide, Platinum (IV) chloride, Platinum (IV) fluoride, Platinum (IV) iodide, Platinum (VI) fluoride, Rhenium carbonyl, Rhenium (III) bromide, Rhenium (III) chloride, Rhenium (III) iodide, Rhenium (IV) chloride, Rhenium (IV) fluoride, Rhenium (V) bromide, Rhenium (V) chloride, Rhenium (V) fluoride, Rhenium (VI) chloride, Rhenium (VI) fluoride, Rhenium (VI) oxytetrachloride, Rhenium (VI) oxytetrafluoride, Rhenium (VII) fluoride, Rhenium (VII) trioxycloride, Rhenium (VII) trioxyfluoride, Rhenium (VII) dioxytrifluoride, Rhenium (VII) oxypentafluoride, Ruthenium dodecacarbonyl, Ruthenium (III) bromide, Ruthenium (III) chloride, Ruthenium (III) fluoride, Ruthenium (III) iodide, Ruthenium (IV) fluoride, Ruthenium (V) fluoride, Tantalum (V) bromide, Tantalum (V) chloride, Tantalum (V) fluoride, Tantalum (V) iodide, Titanium (III) bromide, Titanium (III) chloride, Titanium (IV) bromide, Titanium (IV) chloride, Titanium (IV) fluoride, Titanium (IV) iodide, Tungsten carbonyl, Tungsten (II) bromide, Tungsten (II) chloride, Tungsten (II) iodide, Tungsten (III) bromide, Tungsten (III) chloride, Tungsten (V) bromide, Tungsten (V) chloride, Tungsten (V) fluoride, Tungsten (V) oxytribromide, Tungsten (V) oxytrichloride, Tungsten (VI) bromide, Tungsten (VI) chloride, Tungsten (VI) dioxydibromide, Tungsten (VI) dioxydichloride, Tungsten (VI) dioxydiiodide, Tungsten (VI) fluoride, Tungsten (VI) oxytetrabromide, Tungsten (VI) oxytetrachloride, Tungsten (VI) oxytetrafluoride, Vanadium carbonyl, Vanadium (IV) chloride, Vanadium (IV) fluoride, Vanadium (V) fluoride, Vanadyl bromide, Vanadyl chloride, Vanadyl dibromide, Vanadyl dichloride, Vanadyl difluoride, Vanadyl tribromide, Vanadyl trichloride, Vanadyl trifluoride, Zirconium chloride, Zirconium fluoride, Zirconium iodide.

15. The product of claim 11, wherein said metal precursor is selected from $TiCl_4$, $WCl_6$, $WCl_5$, $WCl_4$, $WBr_5$, $WO_2Cl_2$, $WOCl_4$, $MoCl_5$, $Mo(CO)_5$ and $W(CO)_6$, $Ga(CH_3)_3$, $W(CH_2CH_3)_5$ and $In(CH_3)_3$.

16. The product of claim 11, wherein said metal chalcogenide is selected from $TiS_2$, $TiSe_2$, $TiTe_2$, $WS_2$, $WSe_2$, $WTe_2$, $MoS_2$, $MoSe_2$, $MoTe_2$, $SnS_2$, $SnSe_2$, $SnTe_2$, $RuS_2$, $RuSe_2$, $RuTe_2$, $GaS$, $GaSe$, $GaTe$, $In_2S_3$, $In_2Se_3$, $In_2Te_3$, $InS$, $InSe$, $Hf_2S$, $HfS_2$, $ZrS_2$, $VS_2$, $ReS_2$ and $NbS_2$.

17. The product of claim 11, wherein said process comprises controlling the flow of the vapor of the metal precursor into said reaction chamber by controlling the temperature used for heating the metal precursor to be in the range of between 50 degree below the boiling point and up to the boiling point of said metal precursor.

18. The product of claim 11, wherein the temperature within the reaction zone is in the range of 500 to 900° C.

19. The product of claim 1, wherein the nanoparticles have a hollow core of a diameter substantially not exceeding 5-10 nm.

* * * * *